United States Patent
Hahn et al.

(10) Patent No.: US 10,524,180 B2
(45) Date of Patent: Dec. 31, 2019

(54) METHOD AND APPARATUS FOR CONTROLLING HANDOVER IN AN ENVIRONMENT SUPPORTIVE OF MOVING CELLS

(71) Applicant: LG ELECTRONICS INC., Seoul (KR)

(72) Inventors: Genebeck Hahn, Seoul (KR); Jaehoon Chung, Seoul (KR); Eunjong Lee, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 15/302,574

(22) PCT Filed: Feb. 24, 2015

(86) PCT No.: PCT/KR2015/001754
§ 371 (c)(1),
(2) Date: Oct. 7, 2016

(87) PCT Pub. No.: WO2015/156497
PCT Pub. Date: Oct. 15, 2015

(65) Prior Publication Data
US 2017/0026891 A1    Jan. 26, 2017

Related U.S. Application Data

(60) Provisional application No. 61/977,597, filed on Apr. 9, 2014.

(51) Int. Cl.
*H04W 36/30* (2009.01)
*H04W 48/12* (2009.01)
(Continued)

(52) U.S. Cl.
CPC ........... *H04W 36/30* (2013.01); *H04W 36/08* (2013.01); *H04W 36/24* (2013.01);
(Continued)

(58) Field of Classification Search
CPC ............. H04W 36/00; H04W 36/0016; H04W 36/0083; H04W 36/08; H04W 36/24; H04W 84/005; H04W 36/30
See application file for complete search history.

(56) References Cited

U.S. PATENT DOCUMENTS 6,192,245 B1 * 2/2001 Jones .................... H04W 36/04
455/437
9,084,074 B2 * 7/2015 Jang ........................ H04W 4/70
(Continued)

FOREIGN PATENT DOCUMENTS

CN      1997209 A      7/2007
CN    102625368 A      8/2012
(Continued)

OTHER PUBLICATIONS

Ericsson, "Handover Restriction List," 3GPP TSG SA WG2 Architecture—S2#59, SA WG2 Temporary Document, 52-073340, Helsinki, Finland, Aug. 27-31, 2007 (Server date Aug. 22, 2007), pp. 1-3, XP050773025.
(Continued)

*Primary Examiner* — Brian D Nguyen
*Assistant Examiner* — Deepa Belur
(74) *Attorney, Agent, or Firm* — Birch, Stewart, Kolasch & Birch, LLP

(57) ABSTRACT

Disclosed is a method for a 1st moving cell base station to control a handover in a wireless communication system supportive of a moving cell. The present invention includes performing measurement on signals of at least one or more neighbor base stations and determining whether to make a
(Continued)

handover based on a result of the measurement. Moreover, the 1st moving cell base station controls the handover not to be made into a 2nd moving cell among the at least one or more neighbor base stations using information on a moving cell dedicated cell ID.

13 Claims, 4 Drawing Sheets

(51) Int. Cl.
*H04W 36/24* (2009.01)
*H04W 36/08* (2009.01)
*H04W 84/00* (2009.01)
*H04W 88/02* (2009.01)
*H04W 88/08* (2009.01)
*H04W 36/00* (2009.01)

(52) U.S. Cl.
CPC ......... *H04W 36/245* (2013.01); *H04W 48/12* (2013.01); *H04W 36/0061* (2013.01); *H04W 36/0085* (2018.08); *H04W 84/005* (2013.01); *H04W 88/02* (2013.01); *H04W 88/08* (2013.01)

(56) References Cited

U.S. PATENT DOCUMENTS

| | | | |
|---|---|---|---|
| 9,363,718 B2* | 6/2016 | Lee | H04W 36/0061 |
| 9,369,931 B2* | 6/2016 | Norman | H04W 24/02 |
| 2009/0168728 A1 | 7/2009 | Pani et al. | |
| 2012/0003962 A1* | 1/2012 | Jeon | H04W 36/0083 455/411 |
| 2012/0264443 A1* | 10/2012 | Ng | H04W 60/04 455/450 |
| 2012/0282932 A1* | 11/2012 | Yu | H04W 84/005 455/437 |
| 2013/0176952 A1* | 7/2013 | Shin | H04L 5/001 370/329 |
| 2013/0225168 A1 | 8/2013 | Singh et al. | |
| 2014/0036707 A1 | 2/2014 | Kitazoe et al. | |
| 2014/0274060 A1* | 9/2014 | Fujishiro | H04W 8/14 455/436 |
| 2015/0181502 A1* | 6/2015 | Hans | H04W 40/22 455/437 |
| 2015/0312824 A1* | 10/2015 | Thalanany | H04W 36/165 455/435.1 |
| 2015/0334625 A1* | 11/2015 | Banks | H04W 64/003 455/440 |
| 2016/0286521 A1* | 9/2016 | Terao | H04W 64/003 |
| 2017/0026891 A1 | 1/2017 | Hahn et al. | |
| 2017/0311216 A1* | 10/2017 | Mythri Hunukumbure | H04W 36/04 |
| 2019/0037466 A1* | 1/2019 | Saiwai | H04W 76/14 |

FOREIGN PATENT DOCUMENTS

| | | |
|---|---|---|
| GB | 2504756 A | 2/2014 |
| KR | 10-2005-0063614 A | 6/2005 |
| WO | WO 2013/155643 A1 | 10/2013 |
| WO | WO 2015/156497 A1 | 10/2015 |

OTHER PUBLICATIONS

Infineon Technologies, "Extended PCI Set for CSG Cells," 3GPP TSG-RAN WG1 #53bis, R1-082708, Warsaw, Poland, Jun. 30-Jul. 4, 2008, pp. 1-3, XP050110945.

Institute for Information Industry (III) et al., "Handover Procedures for Mobile RN," 3GPP TSG RAN WG3 Meeting #74, R3-112962, San Francisco, USA, Nov. 14-18, 2011 (Server date Nov. 5, 2011), 4 pages, XP050566244.

Potevio, "How RNs Get Proper Information for HO Type Determination," 3GPP TSG-RAN WG3 #69, R3-102136, Madrid, Spain, Aug. 23-27, 2010 (Server date Aug. 15, 2010), 4 pages, XP050453016.

* cited by examiner

METHOD AND APPARATUS FOR CONTROLLING HANDOVER IN AN ENVIRONMENT SUPPORTIVE OF MOVING CELLS

CROSS REFERENCE TO RELATED APPLICATIONS

This application is the National Phase of PCT International Application No. PCT/KR2015/001754, filed on Feb. 24, 2015, which claims priority under 35 U.S.C. 119(e) to U.S. Provisional Application No. 61/977,597, filed on Apr. 9, 2014, all of which are hereby expressly incorporated by reference into the present application.

TECHNICAL FIELD

The present invention relates to a wireless communication system, and more particularly, to a method of efficiently supporting a handover in a wireless environment supportive of moving cells and apparatus therefor.

BACKGROUND ART

As one example of a wireless communication system to be improved by having the present invention apply thereto, 3GPP LTE ($3^{rd}$ generation partnership project long term evolution) (hereinafter abbreviated LTE) communication system is schematically described as follows.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information, and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

In order to improve performance of the related art LTE communication system mentioned in the above description, ongoing discussions are made on 5G communication technology. And, the 5G communication system may support cells of various types as well as an existing base station of a fixed type.

DISCLOSURE

Technical Task

In the following description, a method of efficiently supporting a handover in a wireless environment supportive of moving cells and apparatus therefor are proposed.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one technical aspect of the present invention, provided herein is a method of controlling a handover, which is controlled by a $1^{st}$ moving cell base station in a wireless communication system, the method including the steps of performing measurement on signals of at least one or more neighbor base stations and determining whether to make a handover based on a result of the measurement, wherein the $1^{st}$ moving cell base station controls the handover not to be made into a $2^{nd}$ moving cell among the at least one or more neighbor base stations using information on a moving cell dedicated cell ID.

In another technical aspect of the present invention, provided herein is a moving cell base station device in a device capable of operating as a $1^{st}$ moving cell base station in a wireless communication system, the moving cell base station device including a transceiving unit configured to perform measurement on signals of at least one or more neighbor base stations and a processor connected to the transceiving unit, the processor determining whether to make a handover based on a result of the measurement, the processor controlling the handover not to be made into a $2^{nd}$ moving cell among the at least one or more neighbor base stations using information on a moving cell dedicated cell ID.

The following matters may be included in the above technical aspects of the present invention.

The moving cell dedicated cell ID may be previously determined as a cell ID using a specific root index of Zadoff-Chu Sequence.

The specific root index may be determined in a manner that a sum with a prescribed one of root indexes available for a cell search of a legacy user equipment corresponds to a length of the Zadoff-Chu Sequence.

The length of the Zadoff-Chu Sequence may include 63, the root indexes available for the cell search of the legacy user equipment may include 25, 29 and 34, and the specific root may include 38.

The specific root index may be determined in a manner that a sum with a prescribed one of root indexes available for a cell search of a user equipment supportive of a moving cell corresponds to a length of the Zadoff-Chu Sequence. In this case, the length of the Zadoff-Chu Sequence may include 63 and the root indexes available for the cell search of the user equipment supportive of the moving cell may include even numbers equal to or greater than 6.

The $1^{st}$ moving cell base station may secure information on the moving cell dedicated cell ID through system information broadcasted by the $2^{nd}$ moving cell base station.

The $1^{st}$ moving cell base station may receive the information on the moving cell dedicated cell ID through System Information Block Type 1 broadcasted by the $2^{nd}$ moving cell base station. The $1^{st}$ moving cell base station may receive the information on the moving cell dedicated cell ID through an access barring information parameter (AC Barring Parameter) of System Information Block Type 2 broadcasted by the $2^{nd}$ moving cell base station.

The $1^{st}$ moving cell base station may control the measurement not to be performed on the signal of the $2^{nd}$ moving cell among the signals of the at least one or more neighbor base stations using the information on the moving cell dedicated cell ID.

Advantageous Effects

Accordingly, the present invention may provide the following effects and/or features.

First of all, the present invention can prevent a delay generated from attempting a handover unnecessarily in response to a movement of a moving cell in a high-density wireless environment.

Secondly, the present invention can prevent an unnecessary measurement on a moving cell in a channel quality measurement procedure.

Thirdly, the present invention uses a cell ID having a complex conjugate property with a cell ID in a legacy system for a moving cell, thereby facilitating a cell search of a user equipment.

Effects obtainable from the present invention may be non-limited by the above-mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

Best Mode for Invention

Reference will now be made in detail to the preferred embodiments of the present invention, examples of which are illustrated in the accompanying drawings. In the following detailed description of the invention includes details to facilitate the full understanding of configurations, functions and other features of the present invention. The embodiments mentioned in the following description include the examples of applying the technical features of the invention to 3GPP systems.

Although embodiments of the invention are described in the present specification using LTE system and LTE-A system for example, they are applicable to any communication systems corresponding to the above definitions.

As mentioned in the foregoing description, a 5G mobile communication system can support cells of various types as well as a cell by a fixed type base station.

Figure 1:
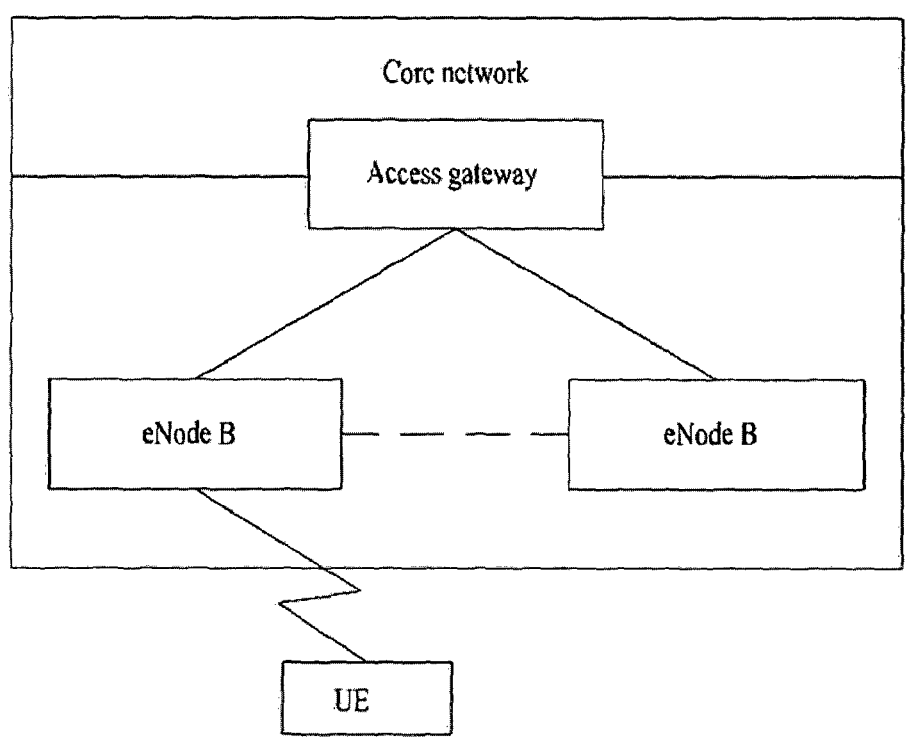
FIG. 1 is a schematic block diagram of E-UMTS network structure as one example of a wireless communication system.
Figure 2:
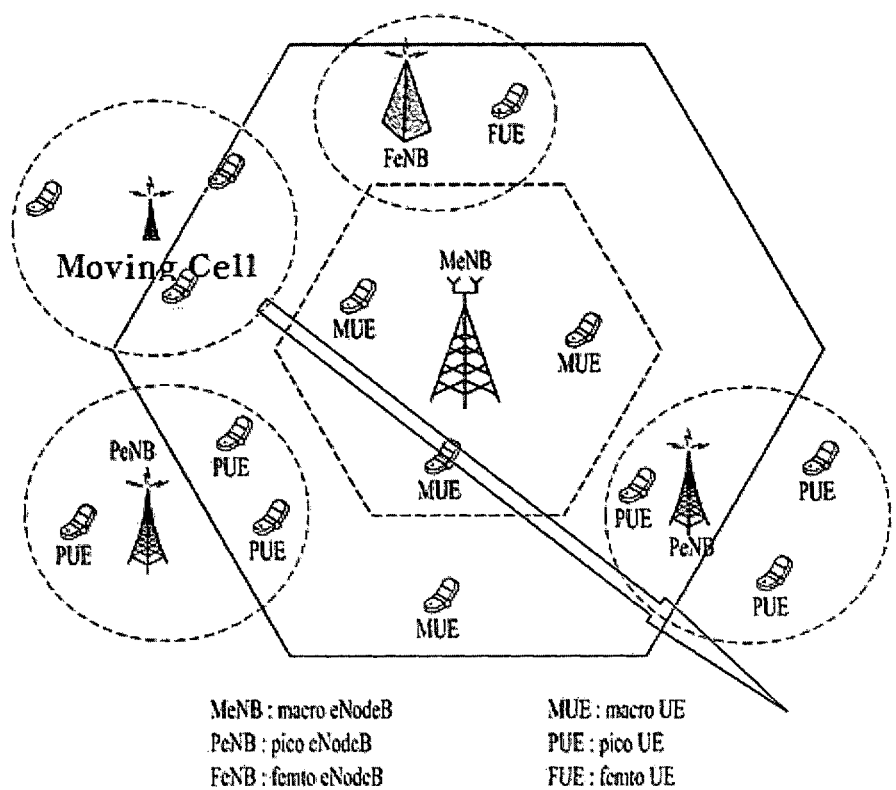
FIG. 2 is a diagram for one example of a 5G mobile communication system to which the present invention is applicable.

FIG. 2 is a diagram for one example of a 5G mobile communication system to which the present invention is applicable.

Referring to FIG. 2, a single macro cell may include user equipments (hereinafter called Macro UE (MUE)) serviced by a macro base station (Macro eNB (MeNB)). In addition, FIG. 2 shows that pico cells corresponding to a sort of a micro cell are formed on an edge area of a macro cell so as to be serviced by pico base station (Pico eNBs (PeNBs) and a femto base station (Femto eNB (FeNB)) configuring a femto cell. A user equipment (UE) serviced by pico base stations can be represented as Pico UE (PUE) to be distinguished from MUE. Moreover, a user equipment serviced by a femto base station can be represented as FUE to be distinguished from MUE or PUE. PeNB/FeNB is one example of a base station that provides a service to a micro cell or a small cell. And, a small base station of one of various types may correspond to the PeNB/FeNB.

Since additional installation of a macro eNB is inefficient in aspects of costs and complexity in comparison with system performance enhancement, it is estimated that utilization of a heterogeneous network by installation of the above-mentioned micro eNB (or small cell) will increase.

According to a structure of a heterogeneous network currently considered by a communication network, a multitude of micro cells coexist within a single micro cell, as shown in FIG. 2, and corresponding UEs are serviced with allocation of resource by cell coordination.

In 'Small Cell Enhancements for E-UTRA and E-UTRAN SI' corresponding to one field of the current standardization category of 3GPP, many ongoing discussions are made to enhance indoor/outdoor scenarios for using lower-powered nodes. In particular, the ongoing discussions are made on gains in the dual connectivity concept for a user to have dual connectivity to a macro cell layer and small cell layers using the same or different carriers. Considering such trends, as many small cells are disposed in the 5G wireless communication environment more complicatedly than shown in FIG. 2, final users seem to be located physically closer to a network.

Moreover, the present invention assumes a wireless environment in which a moving cell exists as another type of a cell. Unlike a small cell of a fixed type considered by 3GPP until now, as one example of a small cell operating method considerable in a 5G wireless communication environment, a moving cell concept can be taken into consideration. A moving cell mentioned in the following description can be illustrated into a cell that provides more capacity to final users by moving through a small base station loaded on a bus, a train, or a smart vehicle. In particular, a moving cell can be defined as a wireless node on a network forming a physical cell.

Using such a moving cell, group mobility can be provided to final users and a concentrated traffic of high capacity can be provided in backhaul link. To this end, a backhaul ranging from a fixed infrastructure to a bus/train/smart vehicle assume wireless and an in-band communication within the bus/train/smart vehicle assumes Full Duplex.

Basic features for potential application scenarios of a 5G moving cell handled by the present invention can be summarized into Table 1 as follows.

TABLE 1

| Category | Backhaul Distance | Mobility | Moving Pattern | Access Link User Load |
|---|---|---|---|---|
| Public Transportation Means | Long | Wide speed range | Fixed | Medium/ High |
| Smart Vehicle | Medium/ Short | Wide speed range | Arbitrary | Low/ Medium |
| Personal Cell | Various | Low speed range | Arbitrary | Low/ Medium |

As mentioned in the foregoing description, in the 5G wireless communication environment, it is expected that a moving cell based communication will be performed as well as a fixed small cell based communication of the related art. In order to enable the moving cell based communication, moving cell specialized technical problems or issues differentiated from the fixed small cell based technical problems or issues should be deduced and solved, which may considerably affect current RAN.

To this end, basic operations of a user equipment and a base station in LTE system are described as follows.

Figure 3:
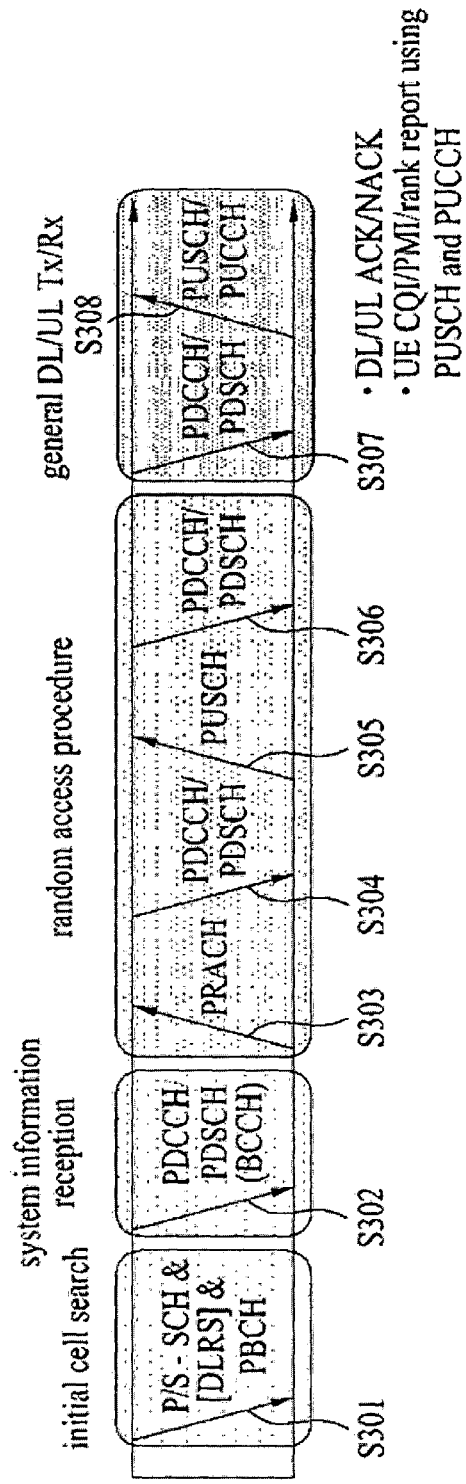
FIG. 3 is a diagram to describe physical channels used for LTE system and a general signal transmitting method using the physical channels.

FIG. 3 is a diagram for explaining physical channels used by 3GPP system and a general signal transmitting method using the same.

Referring to FIG. 3, if a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

In the above-described operations of the user equipment and the base station, one problem is expected in operating the moving cell shown in FIG. 2 as follows. First of all, when a moving cell moves through the congested heterogeneous network, as shown in FIG. 2, channel quality measurements of MUEs, PUEs and FUEs are affected so that existing base stations may make unnecessary handovers into the moving cell. For instance, when a moving cell moves on a path shown in FIG. 2, an MUE having received a service through a macro cell may attempt to make a handover into the moving cell. Yet, when the corresponding MUE attempts the handover, the moving cell may have passed a location of the MUE already.

Moreover, in a moving cell supportive environment, a moving cell is configured to provide a service to UEs within the moving cell by being connected to a fixed base station like a user equipment. Hence, it is necessary for the moving cell to perform a handover procedure for a connection to a fixed cell. To this end, the moving cell (e.g., a 1st moving cell) can discover a handover target by performing a channel measurement on a neighbor cell signal. Yet, in case that a different moving cell (e.g., a $2^{nd}$ moving cell) exists in a congested heterogeneous network environment, the $1^{st}$ moving cell determines a handover through a search for a $2^{nd}$ moving cell signal and may then attempt an unnecessary handover.

Therefore, according to one embodiment of the present invention, it is proposed that a base station controls a user equipment not to make a handover into a cell having a moving cell dedicated cell ID using information on the moving cell dedicated cell ID. For instance, MeNB shown in FIG. 2 secures an ID information of a moving cell and is able to control MUEs to make handovers into the moving cell using the ID information. Moreover, it is proposed that the moving cell shown in FIG. 2 is prevented from making a handover into a different moving cell through the moving cell dedicated ID information.

A moving cell dedicated cell ID may be previously determined as a cell ID that uses a specific root index of Zadoff-Chu (ZC) sequence. Moreover, according to one preferred embodiment of the present invention, it is proposed that a sum with a prescribed root index of a ZC sequence used for a moving cell dedicated index to specify a cell ID of an LTE system uses a root index configured to satisfy a ZC sequence length. This is described in detail as follows.

In LTE/LTE-A, 504 unique physical layer cell IDs are defined. Physical layer cell IDs are grouped into 168 unique physical layer cell ID groups and each of the physical layer cell ID groups has 3 unique IDs. Hence, a single physical layer cell ID '$N_{ID}^{cell}=3N_{ID}^{(1)}+N_{ID}^{(2)}$' is uniquely defined by the number $N_{ID}^{(1)}$ (this means a physical layer cell ID group) existing in a range between 0~167 and the number $N_{ID}^{(2)}$ (this means a physical layer cell ID in a physical layer cell ID group) existing in a range between 0~2. The $N_{ID}^{(1)}$ corresponds to SSS (Secondary Synchronization Signal) and the $N_{ID}^{(2)}$ corresponds to PSS (Primary Synchronization Signal).

A sequence d(n) used for a primary synchronization signal is generated from a frequency domain ZC sequence. In this case, a ZC sequence root index u is proposed as Table 2 in the following.

TABLE 2

| $N_{ID}^{(2)}$ | Root index $u$ |
|---|---|
| 0 | 25 |
| 1 | 29 |
| 2 | 34 |

Using such root index, a primary synchronization signal having a length of 63 is generated from the following formula.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Formula 1]}$$

In Formula 1, although a finally generated sequence length is 1, this corresponds to a result from using a ZC sequence having a length of 63.

Meanwhile, a sequence d(0), . . . , d(61) used for a secondary synchronization signal is defined as inter-leaved concatenation of two length-31 binary sequences. And, this concatenated sequence is scrambled with a scrambling sequence given by a primary synchronization signal. The concatenation of the two length-31 sequences for defining the secondary synchronization signal has a difference between a subframe 0 and a subframe 5 and corresponds to $0 \leq n \leq 30$.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Formula 2]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Formula 2, indexes $m_0$ and $m_1$ are generated from a physical cell ID group and a corresponding result can be represented as Table 3 in the following.

TABLE 3

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |

TABLE 3-continued

| $N_{ID}^{(1)}$ | $m_0$ | $m_1$ |
|---|---|---|
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |

TABLE 3-continued

| $N_{ID}^{(1)}$ | $m_0$ | $m_1$ |
|---|---|---|
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

In one aspect of the present invention, as mentioned in the foregoing description, in order to prevent an unnecessary handover by prescribing a cell ID of a moving cell and to further prevent an unnecessary measurement, proposed is a method of newly configuring a PCID of a moving cell in access link. In particular, according to the present embodiment, in addition to the 504 physical layer cell IDs of the related art, new physical layer cell IDs for moving cells are defined, according to a detailed example, it is proposed to make 4 PSSs by modifying the related art structure of 0~2 PSSs and 0~167 SSSs into a structure of 0~3 PSSs and 0~167 SSSs without modifying the SSS structure for a physical layer cell ID configuration for a moving cell.

Currently, in LTE-LTE-A, as mentioned in the foregoing description, PSS is generated through a ZC sequence of length 63 and root indexes used in generating the ZC sequence include 29, 34 and 25. A sum of '29' and '34' among the root indexes used in generating the ZC sequence corresponds to the length 63 of the ZC sequence.

Thus, in case that a sum of root indexes corresponds to a ZC sequence length, two sequences have a complex conjugate relation in aspect of the ZC sequence generation formula like Formula 1. When a user equipment performs a cell search, since a user equipment does not perform a correlation operation on each of the two sequences having the complex conjugate relation but is able to reuse an intermediate value of one correlation operation for another correlation operation, the two sequences are advantageous in efficiently reducing an operation amount in performing the cell search.

Therefore, when 168 cell IDs are newly prescribed by adding 1 root index like the present embodiment, it is proposed that a root index to be newly used is set in a manner that a sum with a root index of a legacy system corresponds to a ZC sequence length.

As mentioned in the foregoing description, root indexes of ZC sequence used for PSS generation in LTE system include 29, 34 and 25. Since a sum of '29' and '34' is 63, the '29' and '34' satisfies the corresponding condition. Hence, according to the present embodiment, it is proposed that a root index 38 is used for a newly prescribed cell ID generation. As a sum of the root index 38 mentioned in the foregoing description and the root index 25 in the legacy system corresponds to the ZC sequence length 63, the root index 38 is advantageous in forming a root index pair having a complex symmetric feature with the root index 25.

According to another embodiment of the present invention, it is proposed to utilize total 6 root indexes by adding 3 root indexes for a newly prescribed cell ID instead of adding one root index only. In this case, the total 6 root indexes are proposed to form 3 pairs each of which has the complex symmetric relation mentioned in the foregoing description. In this case, a sum of a root index of a ZC sequence for a moving cell ID and a specific root index of a legacy system may correspond to a ZC sequence length or a sum of a root index of a ZC sequence for a moving cell ID and another newly prescribed root index may correspond to a ZC sequence length.

Currently, in LTE/LTE-A, the number of physical layer cell IDs is defined as 504 configured with the combination of a PSS code sequence and an SSS code sequence. A cell search means a procedure for identifying a cell ID of a specific cell, as mentioned in the foregoing description, in a manner that a UE obtains time/frequency synchronization with one cell. In particular, E-UTRA cell search is based on PSSs/SSSs transmitted in DL and is identically applicable to a neighbor cell search for a measurement in making a handover.

Yet, when a moving cell to be received in a 5G wireless communication environment, once a UE gets on a bus, train or smart vehicle, the UE recognizes the corresponding bus, train or smart vehicle as a serving cell of its own and is then able to exchange DL/UL controls signals or DL/UL data through the bus, train or smart vehicle. This environment is differentiated from a small cell based communication of a fixed type considered up to the 4G wireless communication environment of the related art. In case of a bus, train or smart vehicle, since a multitude of UEs need to be simultaneously serviced, reliability or delay of a communication service may become a more significant issue. In particular, in order to realize a communication through a moving cell, the moving cell should provide a user with a high quality of service in a manner transparent to the change of an environment due to a movement of the moving cell.

Hence, in a neighbor cell search for a channel measurement in a handover defined in a 4G based wireless communication environment, if a moving cell detects and measures moving cells in access link other than fixed based stations in backhaul link, it may cause unnecessary measurement load to the moving cell. Such a problem may cause a problem to other cells adjacent to a moving path of the moving cell as well.

Hence, as mentioned in the foregoing description, if a newly prescribed moving cell dedicated cell ID is determined in advance, a moving cell base station may restrict a handover into a different moving cell having the corresponding cell ID and may also prevent an unnecessary measurement from being performed.

Meanwhile, according to another embodiment of the present invention, proposed is a method of transmitting information on a moving cell dedicated cell ID using system information. In this case, as mentioned in the foregoing description, the moving cell dedicated cell ID may include a newly prescribed cell ID. Yet, it is not mandatory for the moving cell dedicated cell ID to be a newly prescribed cell ID. In particular, a cell ID used by a moving cell among cell IDs used in an existing LTE system can be notified through system information.

In LTE system, SIB Type 1 and SIB Type 2 are used as system informations. In particular, the SIB Type 1 includes evaluation informations indicating whether a UE grants an access to a prescribed cell. And, the SIB Type 2 includes common radio resource configuration informations for all UEs.

First of all, the SIB Type 1 is prescribed as follows.

TABLE 4

```
-- ASN1START
SystemInformationBlockType1 ::=      SEQUENCE {
    cellAccessRelatedInfo            SEQUENCE {
        plmn-IdentityList                PLMN-IdentityList,
        trackingAreaCode                 TrackingAreaCode,
        cellIdentity                     CellIdentity,
        cellBarred                       ENUMERATED {barred, notBarred},
        intraFreqReselection             ENUMERATED {allowed, notAllowed},
        csg-Indication                   BOOLEAN,
        csg-Identity                     CSG-Identity          OPTIONAL -- Need OR
    },
    cellSelectionInfo                SEQUENCE {
        q-RxLevMin                       Q-RxLevMin,
        q-RxLevMinOffset                 INTEGER (1..8)        OPTIONAL -- Need OP
    },
    p-Max                            P-Max                     OPTIONAL,         --
Need OP
    freqBandIndicator                FreqBandIndicator,
    schedulingInfoList               SchedulingInfoList,
    tdd-Config                       TDD-Config                OPTIONAL,      -- Cond
TDD
    si-WindowLength                      ENUMERATED {
                                         ms1, ms2, ms5, ms10, ms15, ms20,
                                         ms40},
    systemInfoValueTag               INTEGER (0..31),
    nonCriticalExtension             SystemInformationBlockType1-v890-IEs  OPTIONAL --
Need OP
}
SystemInformationBlockType1-v890-IEs::=   SEQUENCE {
    lateNonCriticalExtension        OCTET STRING (CONTAINING
SystemInformationBlockType1-v8h0-IEs)         OPTIONAL,     -- Need OP
    nonCriticalExtension                 SystemInformationBlockType1-v920-IEs   OPTIONAL --
Need OP
}
-- Late non critical extensions
SystemInformationBlockType1-v8h0-IEs ::=  SEQUENCE {
    multiBandInfoList                MultiBandInfoList         OPTIONAL,    -- Need OR
    nonCriticalExtension             SystemInformationBlockType1-v9e0-IEs   OPTIONAL --
Need OP
}
SystemInformationBlockType1-v9e0-IEs ::= SEQUENCE {
```

TABLE 4-continued

```
        freqBandIndicator-v9e0        FreqBandIndicator-v9e0    OPTIONAL,    -- Cond
FBI-max
        multiBandInfoList-v9e0        MultiBandInfoList-v9e0    OPTIONAL,    -- Cond
mFBI-max
        nonCriticalExtension          SEQUENCE { }              OPTIONAL -- Need OP
}
-- Regular non critical extensions
SystemInformationBlockType1-v920-IEs ::=   SEQUENCE {
        ims-EmergencySupport-r9       ENUMERATED {true}         OPTIONAL,    --
Need OR
        cellSelectionInfo-v920        CellSelectionInfo-v920    OPTIONAL,    -- Cond
RSRQ
        nonCriticalExtension          SystemInformationBlockType1-v1130-IEs OPTIONAL --
Need OP
}
SystemInformationBlockType1-v1130-IEs ::= SEQUENCE {
        tdd-Config-v1130              TDD-Config-v1130          OPTIONAL,    -- Cond TDD-
OR
        cellSelectionInfo-v1130       CellSelectionInfo-v1130   OPTIONAL,    -- Cond WB-
RSRQ
        nonCriticalExtension    SEQUENCE { }                    OPTIONAL -- Need OP
}
PLMN-IdentityList ::=                 SEQUENCE (SIZE (1..maxPLMN-r11)) OF PLMN-
IdentityInfo
PLMN-IdentityInfo ::=                 SEQUENCE {
        plmn-Identity                       PLMN-Identity,
        cellReservedForOperatorUse          ENUMERATED {reserved, notReserved}
}
SchedulingInfoList ::= SEQUENCE (SIZE (1..maxSI-Message)) OF SchedulingInfo
SchedulingInfo ::=    SEQUENCE {
        si-Periodicity                ENUMERATED {
                                        rf8, rf16, rf32, rf64, rf128, rf256, rf512},
        sib-MappingInfo               SIB-MappingInfo
}
SIB-MappingInfo ::= SEQUENCE (SIZE (0..maxSIB-1)) OF SIB-Type
SIB-Type ::=                          ENUMERATED {
                                        sibType3, sibType4, sibType5, sibType6,
                                        sibType7, sibType8, sibType9, sibType10,
                                        sibType11, sibType12-v920, sibType13-v920,
                                        sibType14-v1130, sibType15-v1130,
                                        sibType16-v1130, spare2, spare1, ...}
CellSelectionInfo-v920 ::=            SEQUENCE {
        q-QualMin-r9                  Q-QualMin-r9,
        q-QualMinOffset-r9            INTEGER (1..8)            OPTIONAL --
Need OP
}
CellSelectionInfo-v1130 ::=           SEQUENCE {
        q-QualMinWB-r11               Q-QualMin-r9
}
-- ASN1STOP
```

According to one example of the present invention, it is proposed that a physical layer ID information for an access link of a moving cell or an indication information indicating a physical layer cell for an access link of a moving cell is transmitted in a manner of being added to an SIG Type 1 message shown in Table 1. If the above-mentioned information added SIB Type 1 is broadcasted by a moving cell, a base station of a neighbor cell (or a neighbor moving cell) may be able to obtain information on the moving cell through the broadcasted SIB Type 1. Moreover, the base station of the neighbor cell (or the neighbor moving cell) broadcasts the SIB Type 1 into a cell, thereby preventing UEs in the cell from measuring a moving cell unnecessarily or making a handover.

Meanwhile, according to another embodiment of the present invention, it is proposed to use SIB Type 2 information. SIB Type 2 has the configuration as follows.

TABLE 5

```
-- ASN1START
SystemInformationBlockType2 ::=       SEQUENCE {
        ac-BarringInfo                SEQUENCE {
                ac-BarringForEmergency         BOOLEAN,
                ac-BarringForMO-Signalling     AC-BarringConfig    OPTIONAL,    --
Need OP
                ac-BarringForMO-Data           AC-BarringConfig    OPTIONAL --
Need OP
        }                                                          OPTIONAL,    --
Need OP
        radioResourceConfigCommon            RadioResourceConfigCommonSIB,
        ue-TimersAndConstants                UE-TimersAndConstants,
        freqInfo                             SEQUENCE {
```

TABLE 5-continued

```
        ul-CarrierFreq              ARFCN-ValueEUTRA         OPTIONAL,
        ul-Bandwidth                ENUMERATED {n6, n15, n25, n50, n75, n100}
                                                             OPTIONAL,     --
Need OP
        additionalSpectrumEmission  AdditionalSpectrumEmission
    },
        mbsfn-SubframeConfigList    MBSFN-SubframeConfigList  OPTIONAL,    --
Need OR
        timeAlignmentTimerCommon    TimeAlignmentTimer,
        ...,
        lateNonCriticalExtension    OCTET STRING (CONTAINING
SystemInformationBlockType2-v8h0-IEs)                        OPTIONAL,    -- Need OP
    [[  ssac-BarringForMMTEL-Voice-r9   AC-BarringConfig      OPTIONAL,    --
Need OP
        ssac-BarringForMMTEL-Video-r9   AC-BarringConfig           OPTIONAL --
Need OP
    ]],
    [[  ac-BarringForCSFB-r10       AC-BarringConfig         OPTIONAL -- Need
OP
    ]]
}
SystemInformationBlockType2-v8h0-IEs ::=   SEQUENCE {
        multiBandInfoList           SEQUENCE (SIZE (1..maxMultiBands)) OF
AdditionalSpectrumEmission OPTIONAL,       -- Need OR
        nonCriticalExtension        SystemInformationBlockType2-v9e0-IEs   OPTIONAL -- Need
OP
}
SystemInformationBlockType2-v9e0-IEs ::= SEQUENCE {
        ul-CarrierFreq-v9e0         ARFCN-ValueEUTRA-v9e0    OPTIONAL,    --
Cond ul-FreqMax
        nonCriticalExtension        SEQUENCE { }             OPTIONAL -- Need OP
}
AC-BarringConfig ::=                SEQUENCE {
        ac-BarringFactor            ENUMERATED {
                                      p00, p05, p10, p15, p20, p25, p30, p40,
                                      p50, p60, p70, p75, p80, p85, p90, p95},
        ac-BarringTime              ENUMERATED {s4, s8, s16, s32, s64, s128, s256, s512},
        ac-BarringForSpecialAC      BIT STRING (SIZE(5))
}
MBSFN-SubframeConfigList ::=        SEQUENCE (SIZE (1..maxMBSFN-Allocations)) OF
MBSFN-SubframeConfig
-- ASN1STOP
```

In the SIB Type 2 message shown in Table 5, if an information indicating a physical layer cell for an access link of a moving cell is included in 'AC Barring Parameter', in a situation applied on the basis of LTE/LTE-A system, a general UE (including a legacy UE) can be set to access a moving cell in the same manner of a related art cell. A neighbor (moving) cell obtains the corresponding information and can be set not to access neighbor moving cells that transmit the SIB Type 2 information. In particular, for at least one access class retained by a moving cell, by setting a value of ac-BarringForSpecialAC field explicitly indicated as a bit string and a bit value explicitly indicating a moving cell to 0, a neighbor (moving) cell is able to perform the above operation with reference to this information.

According to another embodiment, if an indication information indicating that a specific cell identifiable by a moving cell is a small cell is added to the SIB Type 2 message, in a situation applied on the basis of LTE/LTE-A system, the moving cell obtains the corresponding information and neighbor small cells transmitting the SIB Type 2 information can be set not to be accessed. In particular, for at least one access class retained by a moving cell, by setting a value of ac-BarringForSpecialAC field explicitly indicated as a bit string and a bit value explicitly indicating a small cell to 0, the moving cell is able to perform the above operation with reference to this information.

Figure 4:
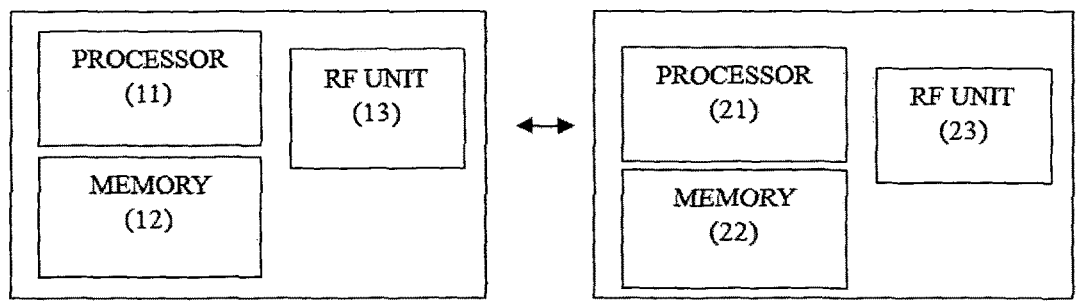
FIG. 4 is a block diagram for a configuration of a communication device according to one embodiment of the present invention.

FIG. 4 is a block diagram for a configuration of a communication device according to one embodiment of the present invention.

Referring to FIG. 4, a communication device may be configured by including a processor 11, a memory 12 and an RF module 13. The communication device can communicate with a different communication device that includes the above-mentioned configuration 21, 22 and 23.

One communication device shown in FIG. 4 may include a UE, while the other may include a base station. The communication device shown in FIG. 4 is illustrated for clarity of the description and modules included in the communication device may be omitted in part. And, the communication device may further include necessary module(s).

The processor 11/21 in the communication device can perform most of controls for implementing the above-described methods according to the embodiments of the present invention. The memory 12/22 is connected to the processor 11/21 so as to store necessary information. The RF unit 13/23 transceives radio signals and is able to forward them to the processor 11/21.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As mentioned in the foregoing description, a method of controlling mobility of a user equipment in a wireless communication system including a moving cell and apparatus therefor are described centering on an example applied to 3GPP LTE system. Moreover, the present invention is applicable to various mobile communication systems as well as to the 3GPP LTE system.

The invention claimed is:

1. A method of controlling a handover by a first moving cell base station in a wireless communication system, the method comprising:
performing measurement on signals of at least one or more neighbor base stations; and
determining whether to make the handover of the first moving cell base station to a target fixed cell based on a result of the measurement,
wherein the first moving cell base station is a wireless node on a network forming a cell for multiple user equipments (UEs),
wherein the first moving cell base station controls the handover of the first moving cell base station not to be tried into a target cell among cells served by the at least one or more neighbor base stations if an already acquired cell identifier (ID) of the target cell, acquired by a primary synchronization signal (PSS) and a physical secondary synchronization signal (SSS), is a moving cell dedicated cell ID,
wherein the handover of the first moving cell base station is for changing a serving cell serving the first moving cell base station,
wherein the serving cell serving the first moving cell base station is restricted to the target fixed cell, and
wherein the first moving cell base station controls the measurement not to be performed on a signal of a second moving cell among the signals of the at least one or more neighbor base stations using the information on the moving cell dedicated cell ID.

2. The method of claim 1, wherein the moving cell dedicated cell ID is previously determined as a cell ID using a specific root index of a Zadoff-Chu Sequence.

3. The method of claim 2, wherein the specific root index is determined in a manner that a sum with a prescribed one of root indexes available for a cell search of a legacy user equipment corresponds to a length of the Zadoff-Chu Sequence.

4. The method of claim 3, wherein the length of the Zadoff-Chu Sequence is 63, wherein the root indexes available for the cell search of the legacy user equipment comprise 25, 29 and 34, and wherein the specific root comprises 38.

5. The method of claim 2, wherein the specific root index is determined in a manner that a sum with a prescribed one of root indexes available for a cell search of a user equipment supportive of a moving cell corresponds to a length of the Zadoff-Chu Sequence.

6. The method of claim 5, wherein the length of the Zadoff-Chu Sequence is 63 and wherein the root indexes available for the cell search of the user equipment supportive of the moving cell comprise even numbers equal to or greater than 6.

7. The method of claim 1, wherein the first moving cell base station secures information on the moving cell dedicated cell ID through system information broadcasted by a second moving cell base station.

8. The method of claim 7, wherein the first moving cell base station receives the information on the moving cell dedicated cell ID through a System Information Block Type 1 broadcasted by the second moving cell base station.

9. The method of claim 7, wherein the first moving cell base station receives the information on the moving cell dedicated cell ID through an access class (AC) barring information parameter of a System Information Block Type 2 broadcasted by the second moving cell base station.

10. A moving cell base station device for controlling a handover in a wireless communication system, the moving cell base station device comprising:
a transceiver configured to perform measurement on signals of at least one or more neighbor base stations; and
a processor connected to the transceiver,
wherein the processor is configured to determine whether to make the handover of the moving cell base station device to a target fixed cell based on a result of the measurement, and control the handover of the moving cell base station device not to be tried made into a target cell among cells served by the at least one or more neighbor base stations if an already acquired cell-a cell identifier (ID) of the target cell, acquired by a primary synchronization signal (PSS) and a physical secondary synchronization signal (SSS), is a moving cell dedicated cell ID,
wherein the moving cell base station device is a wireless node on a network forming a cell for multiple user equipments (UEs),
wherein the handover of the moving cell base station device is for changing a serving cell serving the moving cell base station device, wherein the serving cell serving the moving cell base station device is restricted to the target fixed cell, and wherein the processor controls the measurement not to be performed on a signal of another moving cell among the signals of the at least one or more neighbor base stations using the information on the moving cell dedicated cell ID.

11. The moving cell base station device of claim 10, wherein the moving cell dedicated cell ID is previously determined as a cell ID using a specific root index of a Zadoff-Chu Sequence.

12. The moving cell base station device of claim 11, wherein the specific root index is determined in a manner that a sum with a prescribed one of root indexes available for a cell search of a legacy user equipment corresponds to a length of the Zadoff-Chu Sequence.

13. The moving cell base station device of claim 11, wherein the specific root index is determined in a manner that a sum with a prescribed one of root indexes available for a cell search of a user equipment supportive of a moving cell corresponds to a length of the Zadoff-Chu Sequence.

* * * * *